Feb. 22, 1949.  S. M. KASS  2,462,504
PIPE CLAMP
Filed Jan. 18, 1945
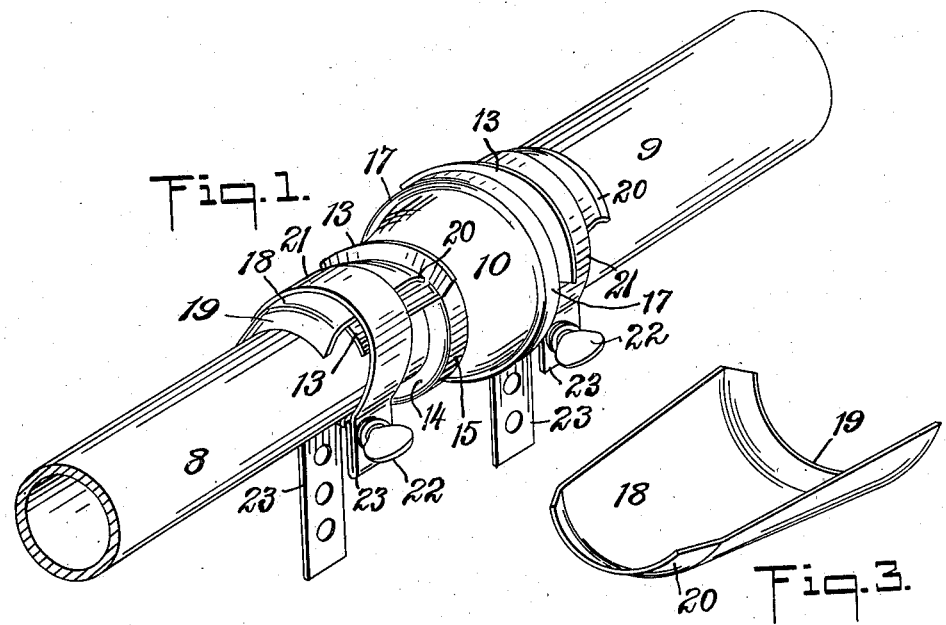
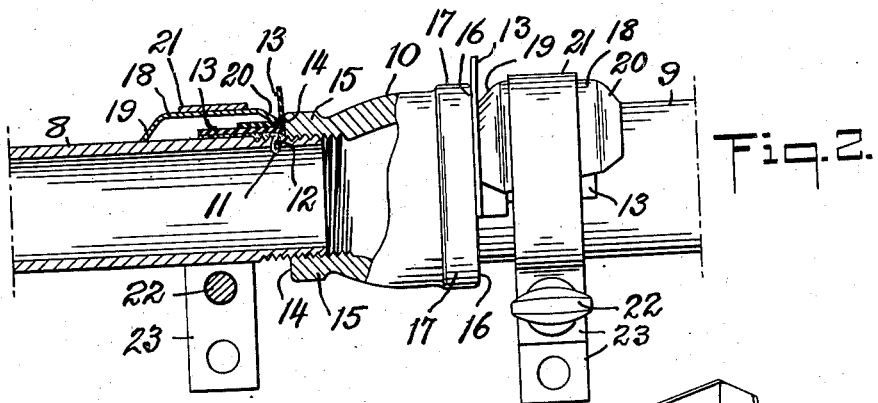
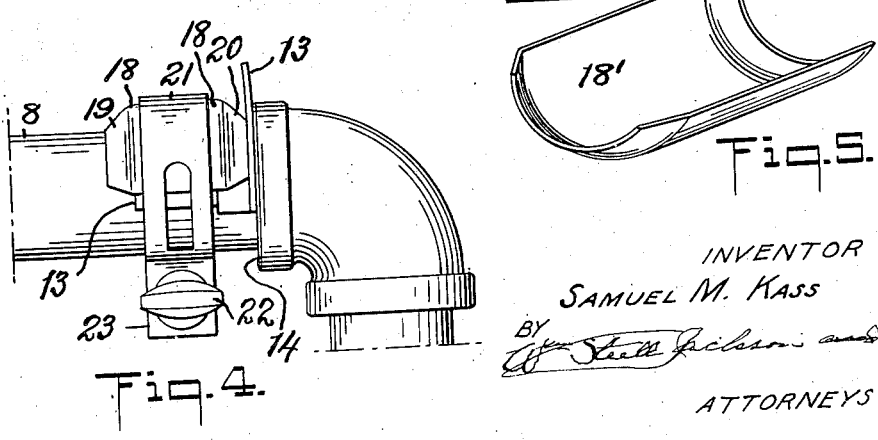
INVENTOR
SAMUEL M. KASS
BY
ATTORNEYS Patented Feb. 22, 1949

2,462,504

UNITED STATES PATENT OFFICE 2,462,504

PIPE CLAMP

Samuel M. Kass, Philadelphia, Pa.

Application January 18, 1945, Serial No. 573,327

4 Claims. (Cl. 138—99)

My invention relates to pipe clamps of a type intended to patch leaks in metal pipes carrying liquids or steam.

The main purpose of my invention is to provide a resilient patch with an applying segment which engages the patch at an edge against a fitting and is hollow in between so as to use the resilience in the hollow portion to maintain pressure upon the "patch," and at the same time to "follow up" the packing so as to take up any permanent distortion of the patch.

A further purpose is to hold a resilient patch against the end of a flange of a pipe fitting where a pipe enters it by a spring compress held in place by a band clamp.

A further purpose is to apply a patch to the shoulder between the flange of a fitting and a pipe, using a spring compress held in position by a band clamp so as to follow up deterioration of the patch material by the spring of the compress.

A further purpose is to apply a patch to a pipe by a resilient compress which maintains follow-up pressure upon the patch, concentrating the pressure at the flange edge.

Further purposes will appear in the specifications and in the claims.

I have preferred to illustrate my invention by one general form only, appearing in several illustrations, selecting a form which is practical, efficient, inexpensive and reliable and which well illustrates the purpose of the invention.

Figure 1 is a perspective view of a reducing coupling with pipes of different sizes connected with the two ends of the coupling and with my invention applied at both pipe ends.

Figure 2 is a side elevation, partly sectioned, of a structure such as is shown in Figure 1.

Figure 3 is a perspective view of one form of compress for a patch.

Figure 4 is a side elevation of my invention applied to the flange where a pipe joints an elbow.

Figure 5 is a slightly different form of compress.

In the drawings similar numerals indicate like parts.

In Figure 1, pipes 8 and 9 of different size are joined by a reducing coupling 10.

At each of the connections of the pipes with the coupling, one of my compresses is applied to concentrate the pressure of the compress upon the portion of the patch immediately against the flange of the coupling. Since the structure and operation, except as to size, and the proportions by which the pressure of the compress against the patch is accentuated, one end only in Figure 2 has been sectioned to show the application of my invention. The sectioned end of Figure 2 well illustrates the construction of the joint at the right hand end of Figure 2 also.

In Figure 2 a leak is represented by the gob 11 of liquid going through an opening 12. About the opening I apply a patch 13 which is pushed against the left end 14 of the smaller coupling flange 15 of the reducing coupling 10; or the patch may be applied against the right end 16 of the larger coupling flange 17.

The difficulty in the past has not been in placing resilient patch material against the end of either flange 15 or 17 but in concentrating pressure upon the patch material down "in the corner" where the patch material must be applied and where its effective operation is made more difficult by the external thread upon the pipe and the cooperating internal threading within the coupling.

My invention is directed primarily to concentrating pressure from the outside down upon flexible packing patch 13 bent about "the corner." The packing must not only be held in the corner tightly in order to succeed in properly packing the joint but must be followed up resiliently as the packing deteriorates. I use a compress or patch such as 18 or 18' of resilient arch construction in axial section, having an end flange 19 or 20 of each arc inwardly flanged to engage the corresponding pipe surface at a distance from the coupling and having an opposite end 20 or 19 which forms a compress flange, intended to bear upon and compress packing material and concentrate pressure upon it "in the corner."

Evidently an arch compress may be used which has slightly different diameters at the two flanged ends, so that the larger flange end 19 can be used for compress engagement with the packing for a larger pipe, and the smaller and flange 20 can be used to engage the packing where the leak is in the smaller pipe, the other flange in each case being used for a fulcrum flange to engage the pipe at another point.

With the understanding therefore that a compress such as that in Figure 3 or in Figure 5 may be turned either way so as (1) to fit against the larger coupling flange 17 in Figure 1, using the larger arch flange 19 of the arch for its compress end and using the smaller arch flange end 20 for fulcrum or, (2), to fit against the smaller coupling flange using the smaller arch flange 20 as at the left in Figure 1 for the sealing effort and the larger arch flange 19 as a fulcrum of the compress, In either event the arch can be tightened to push the compress 18 or 18' against the patch in the "corner" between the pipe and the adjacent face of a coupling flange such as 15 or 17. The patch is thus extended at one end along the length of the pipe, and at its other end at right angles thereto against the flange and pipe where this is joined.

I may use either or both of two patches, an under patch extending along the pipe line and an outer patch relied upon primarily for repairing a leak against the coupling.

The arched longitudinal truss comprising the compress is preferably tightened to position by a strap or band 21 seen in Figures 1 and 2 which tends to bend the compress inwardly, causing the arch to yield on account of the spring of the metal. The arch thus maintains a continued resilient follow up pressure upon the resilient clamp end of the compress, still pressing on the patch when the latter deteriorates.

The strap is tightened and held in place by bolts 22 which draw the strap ends 23 together, bending the arch longitudinally.

The parts are held in position by the several bolts and pressed against the metal as indicated.

In view of my invention and disclosure variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my claims.

Having thus described my invention what I claim as new and desire to secure by Letters Patent is:

1. In a repair clamp for pipe leakage occurring at a coupling flange location, a longitudinally arched laterally curved resilient repair clamp having flanges at axially opposite ends and partly surrounding the pipe transversely between the flanges, a tightening band about the arch between the flanges to surround the clamp and tighten it radially and press the flanges apart and also toward the pipe and a patch adapted to fit against the pipe adjacent the pipe flange and to be engaged by one of the clamp flanges.

2. In a pipe repair member, a resilient compress curved transversely circumferentially and longitudinally to follow the general contour of the pipe at a distance from it and thus forming inwardly directed flanges curved transversely circumferentially at axially opposite ends adapted, one to serve as a fulcrum and the other to engage the patch, the compress being spaced from the pipe except at the flanges, a patch within and under one flange, between the flange and the pipe, and having a bend about one of the flange ends, which bend is compressed by the flange end, and a tightening band circumferentially covering the compress and adapted to tighten the compress against the pipe and to take advantage of the longitudinal spring in the arch formed by the compress.

3. In a pipe repair mechanism for repairs of a pipe adjacent the flange of a coupling into which the pipe is secured, a patch adapted to rest against the pipe at the repair spot and against the flange of the coupling, a resilient compress of general arch form laterally curved to follow the general contour of the pipe for the circumferential width of the patch and having a terminal fitting against the patch at an axial end, a circumferential band about the compress, and a tightening device for the band whereby the compress terminal is tightened to bring pressure resiliently against the patch.

4. In a pipe patching mechanism for pipe leaking at a fitting, a patch adapted to follow the contour of the pipe, a resilient compress circumferentially curved and following the pipe contour part way around but spaced from it, inwardly directed flanges at both axial ends of the compress, one of which flanges forms a fulcrum and the other of which engages the patch adjacent the flange of the fitting, whereby the compress is given an arch form in section longitudinally of the pipe and between the inwardly directed flanges, and a tightening band extending circumferentially about the compress and adapted to apply the compress tightly toward the pipe.

SAMUEL M. KASS.

REFERENCES CITED

The following references are of record in the file of this patent:

UNITED STATES PATENTS

| Number | Name | Date |
|---|---|---|
| 1,728,250 | Pike | Sept. 17, 1929 |
| 2,007,179 | Bullis | July 9, 1935 |
| 2,329,037 | Eisenberg | Sept. 7, 1943 |